United States Patent [19]

Coale, Jr.

[11] 4,121,248
[45] Oct. 17, 1978

[54] STREAK REDUCTION SYSTEM FOR FLIR DISPLAY

[75] Inventor: Cecil R. Coale, Jr., McKinney, Tex.

[73] Assignee: Texas Instruments Incorporated, Dallas, Tex.

[21] Appl. No.: 774,839

[22] Filed: Mar. 7, 1977

[51] Int. Cl.$^2$ ............................................. H04N 5/33
[52] U.S. Cl. .................................. 358/113; 250/333; 250/338; 358/160; 358/167
[58] Field of Search ....................... 358/113, 160, 167; 250/330, 332, 333, 338, 340, 342, 349, 350

[56] References Cited

U.S. PATENT DOCUMENTS

| 3,748,383 | 7/1973 | Grossman | 358/113 |
| 3,751,586 | 8/1973 | Johansson | 358/160 |
| 3,941,923 | 3/1976 | Wheeler | 358/113 |
| 3,944,730 | 3/1976 | Dahlquist | 358/160 |
| 3,971,886 | 7/1976 | Chow | 358/113 |
| 3,975,586 | 8/1976 | Chow et al. | 358/160 |

FOREIGN PATENT DOCUMENTS 1,287,114  1/1969  Fed. Rep. of Germany ........... 358/167

Primary Examiner—Robert L. Griffin
Assistant Examiner—Joseph A. Orsino, Jr.
Attorney, Agent, or Firm—Rene' E. Grossman; Alva H. Bandy

[57] ABSTRACT

An improved a.c. coupled forward looking infrared (FLIR) system is disclosed. In a.c. coupled FLIR systems utilizing an array of detectors, the video signals produced when scanning "hot targets" are distorted toward the dark end of the display dynamic range. This distortion produces dark image obliterating streaks which are substantially reduced by a streak reduction system. In one embodiment video signals for each scan line are delayed in a delay line; while, the mean voltage is determined in an integrator, the mode voltage calculated from the probability density curve and the two summed in an adder to provide a video correction voltage. A sample and hold circuit then applies the video correction signal to the video voltage output of the delay line to produce video signals absent any streaking voltage. In another embodiment the video signals are connected to a first integrator to determine the mean voltage. The mean voltage is held in a first sample and hold circuit while the mean voltage is compared in a comparator with the video signals and the difference integrated in a second integrator to provide a median voltage of an observed probability distribution function which is sampled and held in a second sample and hold circuit for a comparision in a first difference amplifier with a reference d.c. voltage equal to the 50 percent position on the cumulative probability distribution function curve. The output of the first difference amplifier is a calculation of the incremental probability ($\Delta P$). Since horizontal displacements of a family of proportional triangles of moderate skewness can be determined by multiplying vertical displacements by a proportionality constant, $\Delta P$ is multiplied by an observed proportionality constant and the video correction signal $\Delta V$ obtained. The video voltage, the mean voltage and the video correction voltage are added in a second difference amplifier and the corrected video signal applied to an amplifier to restore the gain necessary for display of the corrected video signals on a cathode ray tube.

13 Claims, 10 Drawing Figures

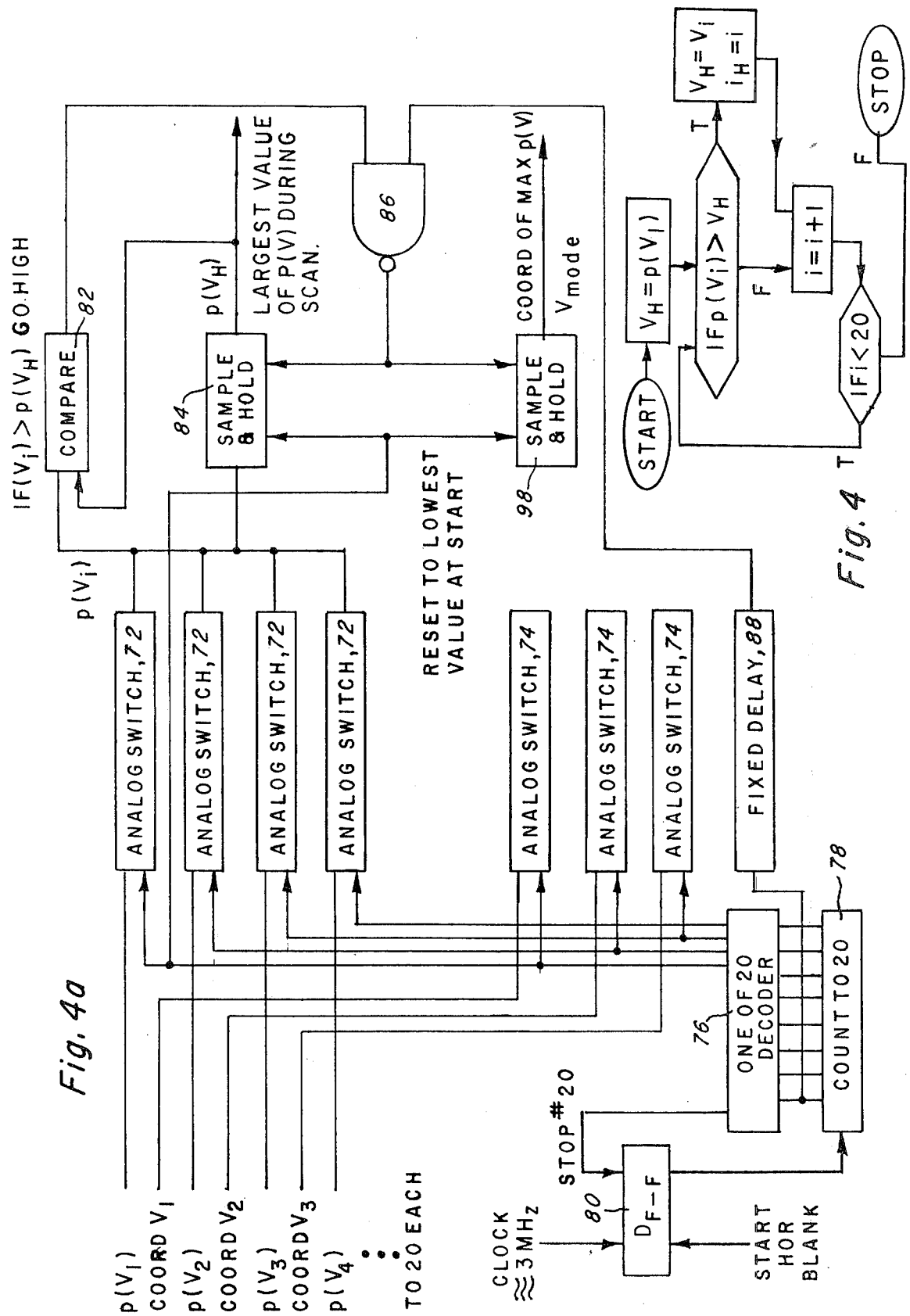

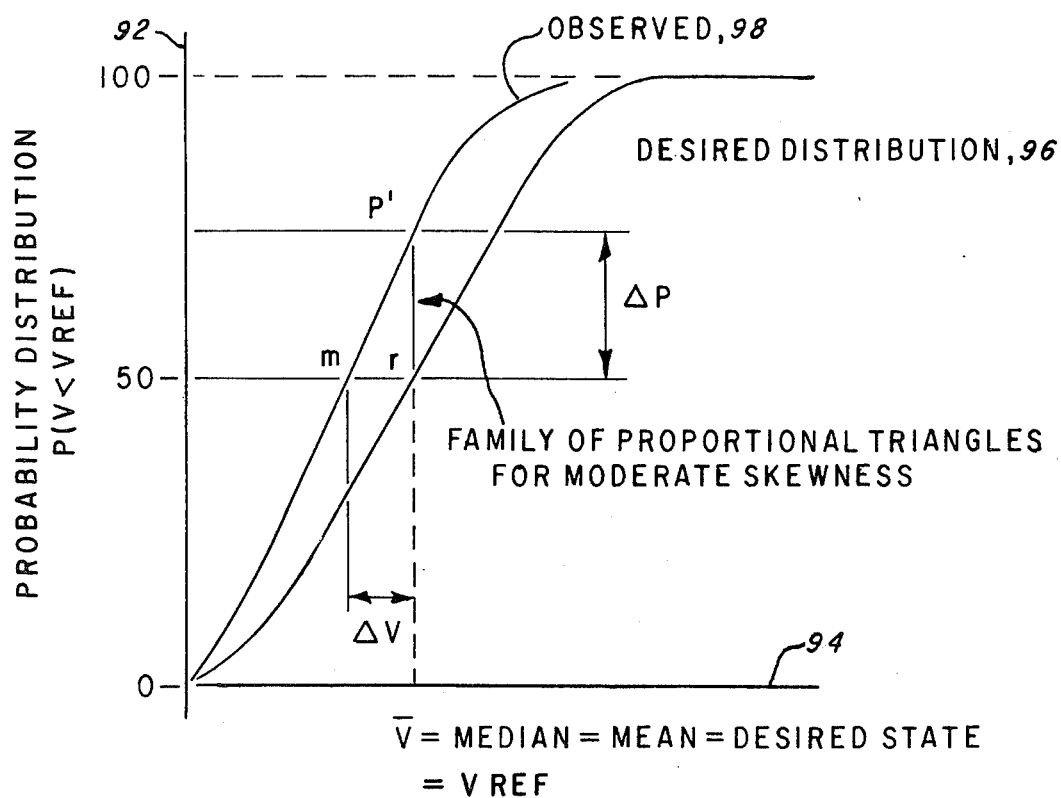

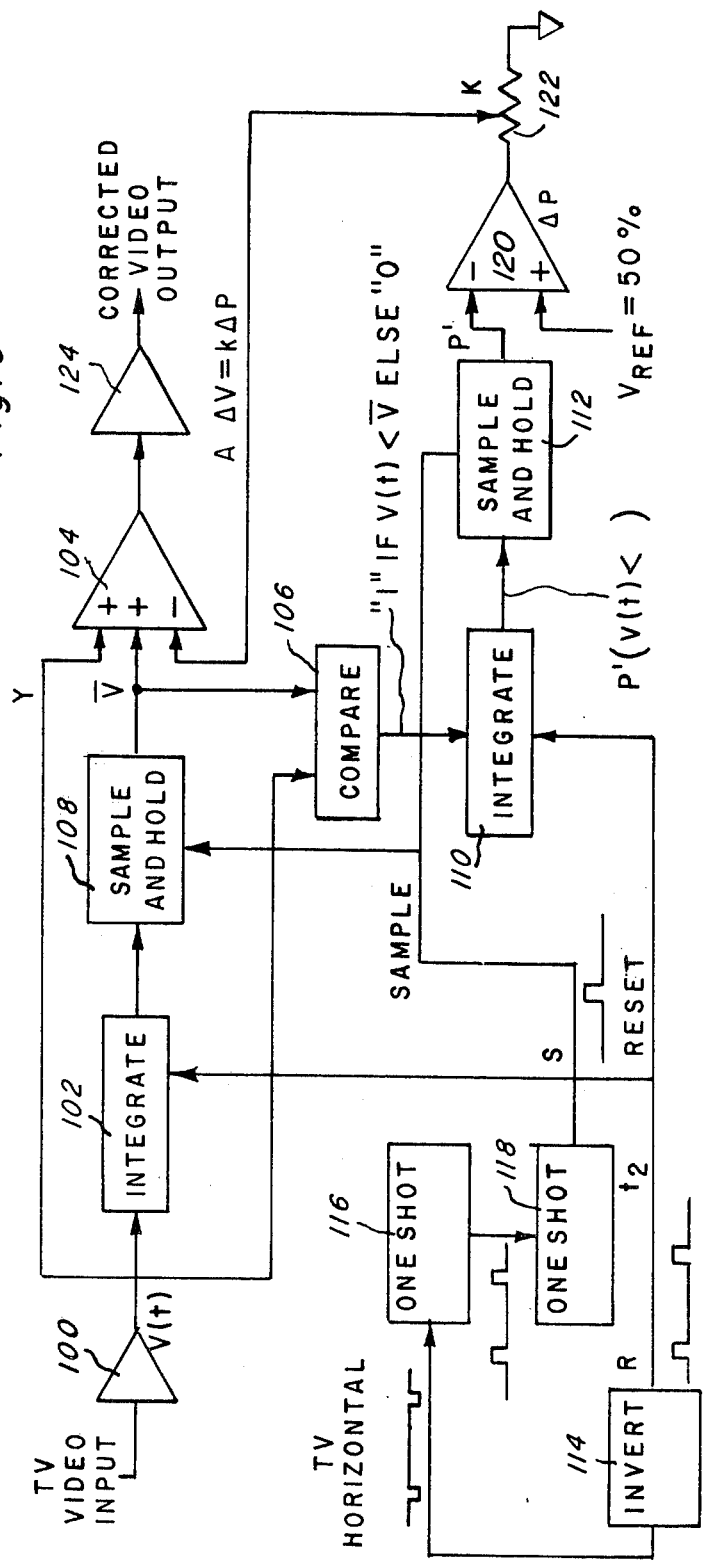

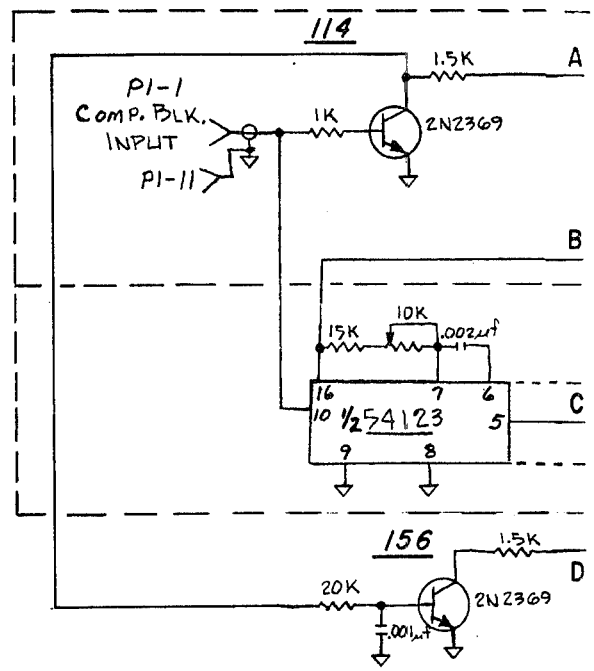
Fig. 7a
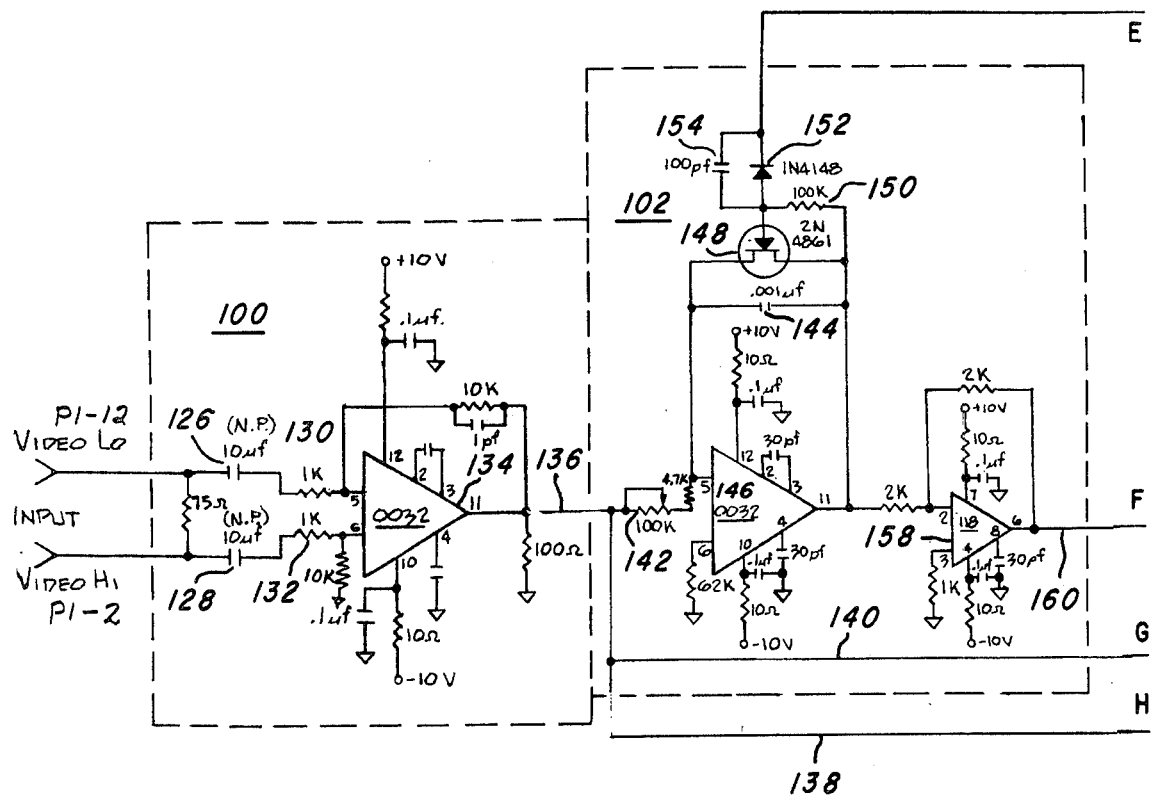

STREAK REDUCTION SYSTEM FOR FLIR DISPLAY

This invention relates to an improved forward looking infrared (FLIR) detector system, and more particularly, to an improved video signal processing system for a FLIR detector system.

Forward looking infrared (FLIR) systems are of two broad types. One type is a d.c. coupled system, and the second type is an a.c. system. Problems exist with both systems. In the d.c. coupled system, for example, the scene scanned must be scanned mechanically at a very high rate (25,000 rpm). The mechanical scanner has a short life time because of this high scanning rate; the result is an unreliable FLIR which has a short lifetime. In the a.c. coupled system, for example, the hot targets in the scene drive the remainder of the scan lines toward the dark end of the display dynamic range. In a television (TV) display, for example, the FLIR operator perceives this change, which is a change in voltage level, as a dark streak across the TV display. The dark streak is objectionable because image detail is obliterated in the streaked area.

This invention is directed to a streak reduction system for a FLIR detector system having its d.c. output a.c. coupled into subsequent amplifier stages. In the past, all streak reduction methods involved the use of time averages to obtain a video correction voltage. Such methods all use variations of the equation:

$$\overline{V} = 1/T \int_O^T v(t)\, dt \quad (1)$$

where:

$\overline{V}$ = the mean value of detected voltages
$T$ = the time of line scan
$v(t)$ = the video waveform An example of a time average system is set forth in the paper, "Automatic Low Frequency Gain Limiting for A.C. Coupled Signal Processing Systems", Sen-Te Chow, Night Vision Laboratory, Fort Belvoir, Va. Although these time averaging anti-streak systems offer some improvement undesirable residual streaking is present.

Accordingly, it is an object of the invention to provide an improved forward looking infrared system.

Another object of the invention is to remove substantially streaking effects from the video signals of a forward looking infrared system for display.

A further object of the invention is to expand the dynamic range of a forward looking infrared system.

Still another object of the invention is to provide a streak reduction system for forward looking infrared systems based upon the calculated actual probability density.

Still a further object of the invention is to provide a streak reduction system for forward looking infrared systems based upon the cumulative probability distribution function.

Briefly stated the invention comprises circuits producing streak correction signals based upon the probability function:

$$\overline{v} = \int_{-\infty}^{+\infty} v p(v)\, dv \quad (2)$$

where $\overline{v}$ is the mean value of detected voltages; and $p(v)$ is the probability density function.

Measurement of the probability density is described in detail in Y. W. Lee, "Statistical Theory of Communication", John Wiley & Sons, Inc., 1961, (pp. 125–130). Those interested in obtaining an exhaustive description of the probability density function are referred to that text book. In one embodiment, vidicon scan signals for one scan line are stored in a delay line as a means for subsequent correction by a video correction signal. The video correction signal is obtained by calculating the mean voltage for one scan line of signals and comparing this with the mode voltage for the same scan line of video signals. The mode value is obtained by calculating the probability density curve for the one scan line of video signals and during a time equal to the fly back time of the CRT scanner locating the maximum of the probability density and its coordinate, which is the mode. The mode value is added to the mean value and the difference held in a sample and hold circuit for addition to the output of the delay line. The corrected video signals are applied to a TV display.

In another embodiment the correction factor is obtained from a probability distribution curve having a desired known state and an observed state. From preselected probability points on these probability distribution functions, a small triangle is formed for moderate skewness which has a vertical leg equal to the difference in probability function for the two curves and a horizontal distance equal to the difference between the mean and median values. For distributions of small skewness, the calculated mean-median value is proportional to the mean-mode value. Therefore, calculation of the median determines the mode value. Small triangles have a proportionality constant which can be observed for solving the horizontal leg which represents the correction voltage to eliminate streaking signals from the video signals from one scan line.

The novel features believed to be characteristic of this invention are set forth in the appended claims. The invention itself, however, as well as other objects and advantages thereof may best be understood by reference to the following detailed description of illustrative embodiments when read in conjunction with the accompanying drawings in which:

FIG. 4 is a flow diagram for the operation of the analog maximum detector;

FIG. 4a is a block diagram of the analog maximum detector used in the first embodiment of the invention;

FIG. 5 is a chart of the second embodiment of the invention using cumulative probability distribution for streak reduction;

FIG. 6 is a functional block diagram of the second embodiment of the invention; and FIGS. 7a-c are a schematic diagram of the second embodiment of the invention with the functional blocks of FIG. 6 shown in dotted lines.

Figure 1:
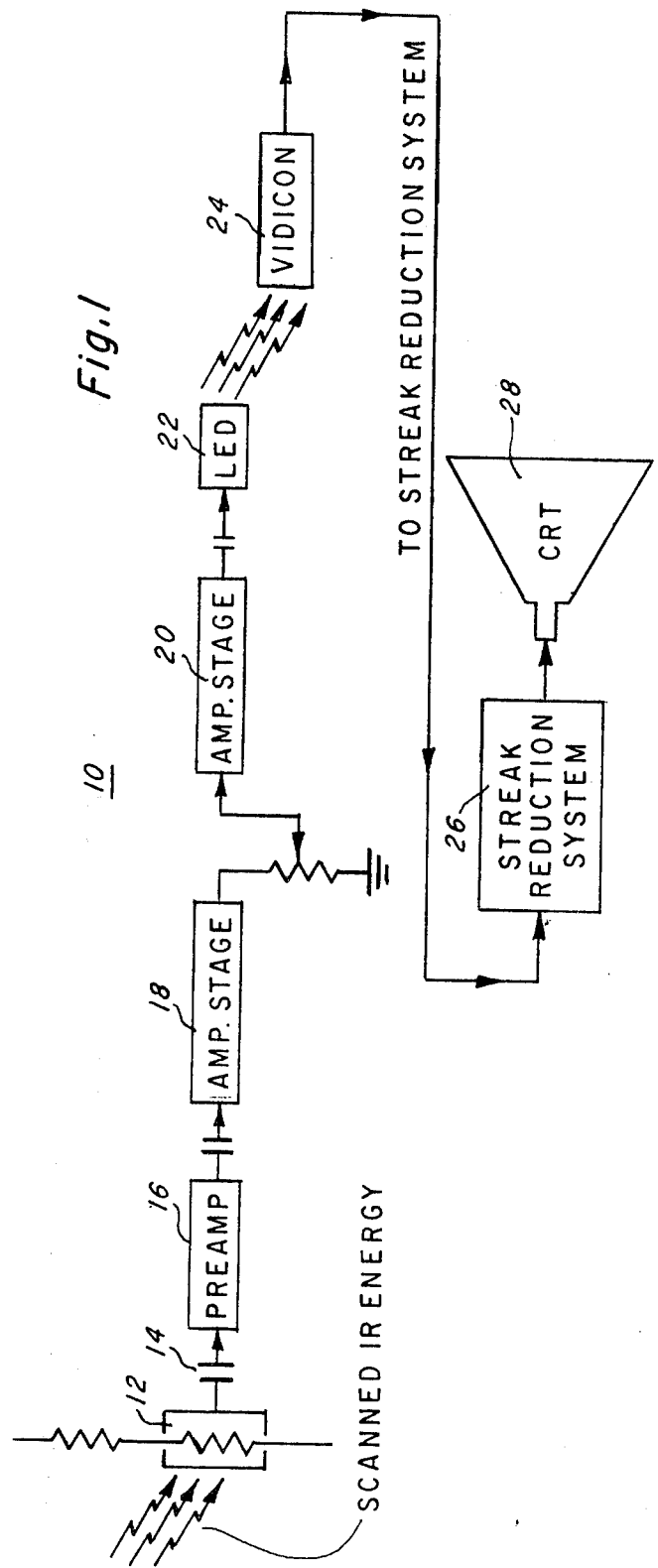
FIG. 1 is a block diagram of a forward looking infrared system having the streak reduction system incorporated.

Referring now to the Figures, there is disclosed in FIG. 1 a block diagram of a forward looking infrared (FLIR) system 10. FLIR system 10 comprises an infrared detector means 12 upon which the scanned infrared energy is focused. The detector 12 may be, for example, a linear array of mercury cadmium telluride (HgCdTe) elements. Although any number of detector elements may be used, for purposes of description, a 200 element array is used. As one field of a scene is scanned in one direction across the elements of the detector array, infrared energy emanating from the field of the scene is converted into electrical energy by the detector array whose voltage is proportional to the intensity of the infrared energy striking the elements. The phase of the scene is shifted downwardly to another field of the scene and the field scanned across the elements of the detector array in the opposite direction at the same rate. Infrared energy emanating from the second field of the scene is converted into electrical energy by the elements of the detector array. Again the detector elements voltages are proportional to the intensity of the infrared energy striking the elements. As the scanning rate of each field is, for example, 1/120th of a second, the time to scan the two fields of view is 1/60th of a second.

Each element of the 200 element detector array 12 is capactively coupled through an amplifying circuit to a corresponding element of a light emitter diode array. As each amplifying circuit is identical only one need be described. Each amplifying circuit includes a capacitor 14 having one plate connected to the detector element of the detector array 12 and its other plate connected to a pre-amplifier 16. The output of pre-amplifier 16 is capacitively coupled to an amplifier stage 18. Amplifier stage 18 is connected through a variable resistor to amplifier stage 20. The amplitude of the output signals of amplifier's stage 20 is about 0.5 to 1.5 volts peak to peak and is connected to light emitting diode 22 of the array of light emitting diodes. The amplified voltages drive the elements of the array of light emitting diodes in proportion to the intensity thereof. Thus the array of light emitting diodes provides a visible display representative of the scene.

The visible light display of the scene is reflected onto the video screen of a vidicon tube 24, and the phosphor is scanned at a rate of 1/60th of a second by the electron gun of the vidicon. The video signals of the vidicon 24 are connected scan line by scan line to the streak reduction system 26.

The streak reduction system 26 provides an approximate d.c. restoration to the video signal output of the vidicon. The correction is necessary as the infrared detector system is a.c. coupled to the pre-amplifier and the d.c. or low frequencies were rolled off by the high pass filter which consists of the capacitor 14 and the resistance of the pre-amplifier 16. The corrected video signals of the streak reduction system 26 are coupled to the CRT 28 for display.

Figure 2:
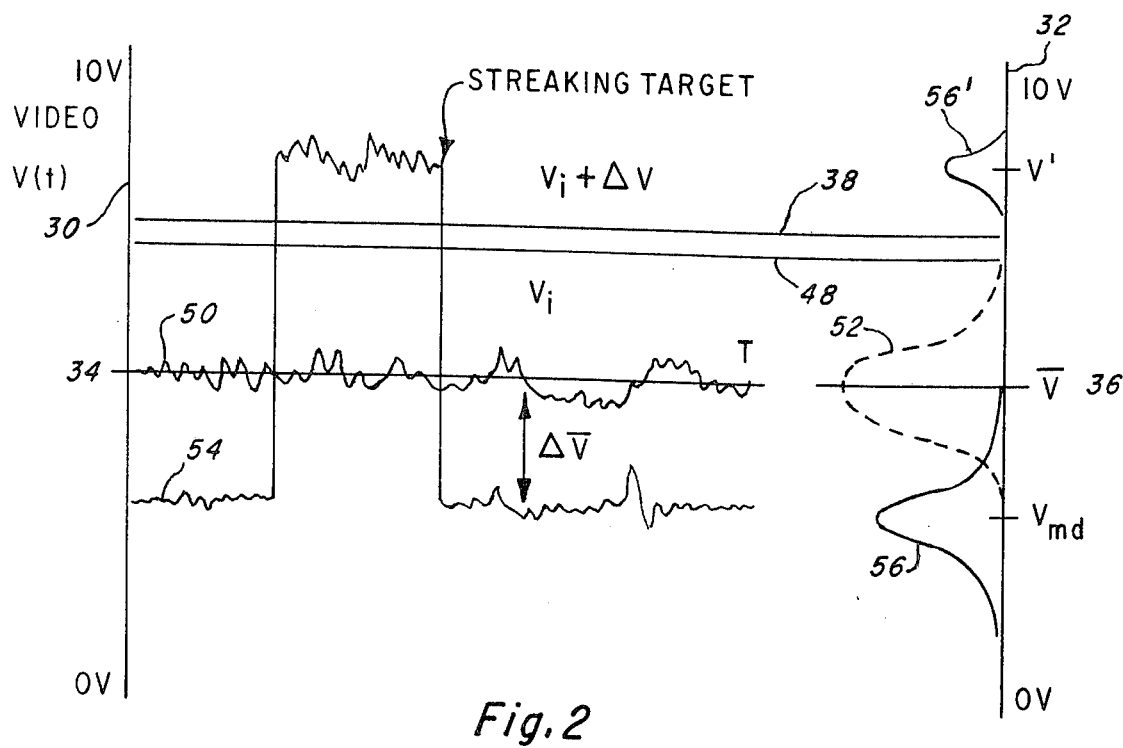
FIG. 2 is a chart showing the relationship of probability density to video waveform.
Figure 3:
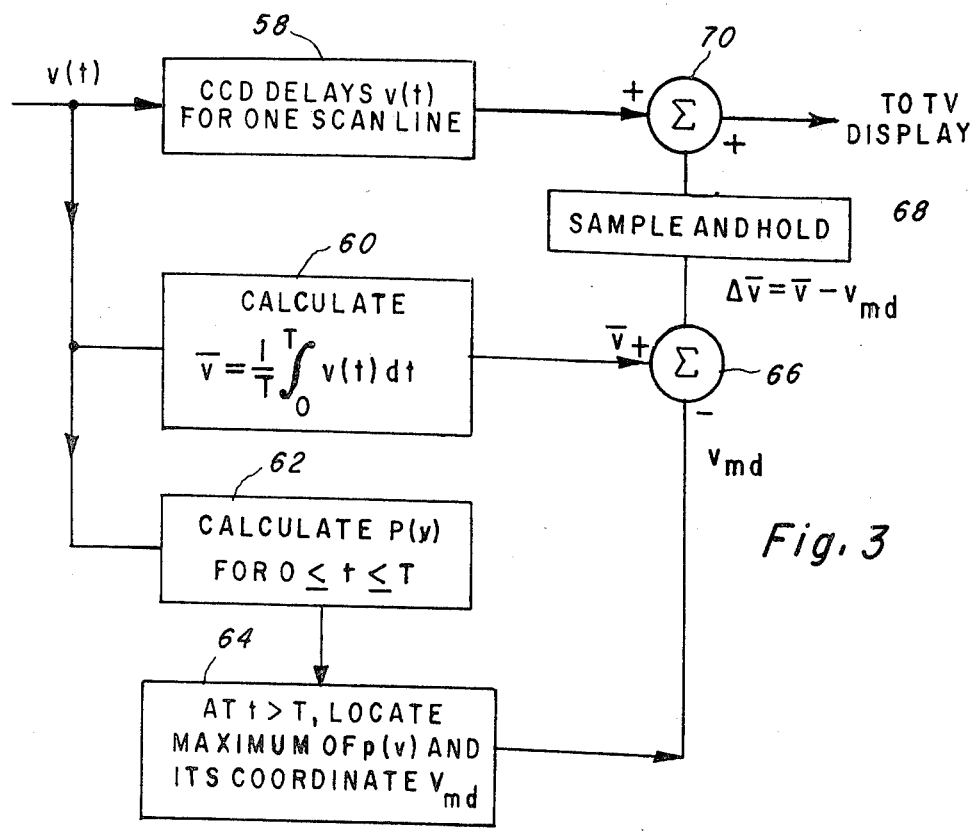
FIG. 3 is a functional block diagram of a first embodiment of the invention utilizing probability density for streak reduction.

Referring now to FIGS. 2 and 3 for a description of the first embodiment of the streak reduction system 26. The operation of the first embodiment is charted in FIG. 2. The left and right vertical axes 30 and 32 represent the dynamic range of the FLIR system which is, for example, between 0 and 10 volts. The horizontal axis 34 represents the time (T) of one scan line of the vidicon. Axis 36 represents probability density and is centered on the mean voltage ($\overline{V}$). Parallel lines 38 and 48 represent the width of one of twenty channels whose width corresponds to the voltage desired to reduce streak intensity to ±0.5 gray shade or 0.5 volts where the dynamic range is 10 gray shades or 10 volts. Waveform 50 represents the signals of one scan line with no hot targets. A "hot" target may be, for example, an extremely hot object such as an internal combustion engine or it might be the sudden change from a ground scene of a scene of the horizon. The dotted bell curve 52 presents the relative time intervals the waveform is within each of the twenty gray shade channels and is a probability density function. The peak of the curve is at the mean voltage ($\overline{V}$). Waveform 54 represents the waveform of a subsequently scanned line in which a hot target is detected. The effect of the hot target is to increase substantially and instantly the amplitude $v(t)$ of the waveform during detection of the hot spot and to decrease the voltage $\Delta V$ below the mean voltage at points before and after detection of the hot target. The area of the portion of the waveform above the mean voltage is equal to the area of the waveform beneath the mean voltage for each scan line. Bell curves 56 and 56' are representative of the relative time intervals of the waveform. The mode voltage of the resulting probability density curve 56 is correspondingly lowered an amount $\Delta \overline{V}$ which is the voltage difference between the mean and mode peaks of the probability density curves 52 and 56.

Referring to FIG. 3 for a description of the first embodiment of the streak reduction system 26. The streak reduction system receives the scan line voltages $V(t)$ from the vidicon 24 (FIG. 1). The voltages for each scan line $V(t)$ are successively applied to a CCD delay line 58 (FIG. 3), an integrator 60 and a plurality of analog processors 62. There is an analog processor 62 for each gray shade channel, that is, for our example there are 20 analog processors calculating $\{P(V_1), P(V_2), \ldots, P(V_{20})\}$ simultaneously. The CCD delay line delays the scan line output for a time equal to the time (T) for the vidicon to scan one line and fly back time $(t)$. During this time the integrator 60 calculates the mean voltage ($\overline{V}$) and the analog processors 62 calculate the probability density curve and voltage points for the scan line time ($0 \leq t \leq T$). During the fly back time $(t)$, an analog maximum detector 64 locates the peak of the probability density curve and its coordinate mode voltage ($V_{md}$) as hereinafter described. The mean voltage of the integrator 60 and the mode voltage of the maximum detector 64 are added in an adder 66 and the difference voltage $\Delta \overline{V}$ is applied to a sample and hold circuit 68 as the streak reduction video correction signal. At the end of fly back $(t)$, the output diode of the CCD delay line and the sample and hold circuit are triggered and the video scan line voltages of the CCD are added to the difference voltage of the sample and hold circuit in an adder 70 to provide corrected video signals to the TV display cathode ray tube 28.

Referring to FIG. 4, a flow diagram for the analog maximum detector shows the start as the first point on the probability density curve, which is compared with itself and moves on. Next, $P_2$ is compared with $V_H$ and if greater than $V_H$ (true) then $V_H$ becomes $V_2$ and $i_H = 2$. However, if $P_2$ is less than $V_H$ (false) then $V_H$ remains unchanged. This procedure is repeated by incrementing index $i$ until $i = 20$. At the end of 20 steps $V_H$ is the maximum of the set (P$_1$, P$_2$ . . ., P$_{20}$) and i$_H$ is its coordinate.

The analog maximum detector 64 (FIG. 4a) comprises a plurality of analog switches 72 and 74. Two analog switches are provided for each gray shade cannel of the analog processor. For twenty gray shade channels, forty analog switches are required. For each channel one of the two switches 72 is coupled to the channel's probability density point and the second switch 74 is coupled to the coordinate voltage point for the corresponding probability density point. Each switch 72 and 74 is coupled to a one of twenty decoder 76, and the pairs of switches 72 and 74 for each channel are coupled in parallel. The decoder 76 is connected to a count by twenty flip flop 78 which is controlled by a flip flop 80 connected to: a 3 MHz clock, not shown; a start signal which is the horizontal blanking signal of the vidicon; and the number 20 terminal of the one of twenty decoder 76. Each analog switch 72 has its output connected to a comparator 82 and a sample and hold circuit 84. The output of the sample and hold circuit is connected to the comparator 82. If the probability density point p(V$_i$) is larger than that of the next point or p(V$_i$)>p(V$_H$) a logic 1 is applied to one terminal of a NAND gate 86. A second terminal of NAND gate 86 is connected through a fixed delay means 88 to an output of the count to twenty counter 78. The count by twenty counter 78 provides a delayed logic 1 signal to NAND gate 86 to control its operation. The inverted output of the NAND gate 86 is connected to the sample and hold circuit 84 and to another sample and hold circuit 98. Sample and hold circuit 98 has its input terminal connected to each of the analog switches 74. The sample and hold circuit 98 output is the coordinate voltage (mode voltage V$_{md}$) at the end of the twenty step scan. The sample and hold circuits 82 and 98 have their reset terminals coupled to the number one terminal of the one of twenty decoder 76.

Referring now to FIGS. 5, 6, and 7a-c for a description of the second embodiment, FIG. 5 is a chart of the operation of the second embodiment of the invention. The vertical axis 92 represents the cumulative probability distribution function expressed in percent and the horizontal axis 94 represents the dynamic range of the FLIR system which is, for example, 0-10 volts for 10 gray shades. To eliminate streaking the desired waveform is centered about the mean voltage $\overline{V}$ and the desired distribution places the peak of the probability density curve at the 50 percent level. The 50 percent level is indicated at point r on the desired distribution curve 96. Absent hot targets the desired distribution curve is obtainable and the mean ($\overline{v}$), median and desired state voltages are equal. However, when a hot target is encountered, an observed distribution curve 98 is produced and the mean voltage point of the desired distribution curve is now located at point P' on the observed curve 98 and the mean voltage point r has moved to the median voltage point m. The difference between the points m-r represents a voltage proportional to the desired video correction signal $\Delta$V. It has been found that a family of proportional triangles (P', r, and m) are formed for moderate skewness; thus, a proportionality constant (k) can be developed and used to determine $\Delta$V directly from the measured differential probability distribution $\Delta$P. This approximation holds true for probability distributions of moderate skewness.

Referring now to FIG. 6 for a description of the circuit for the second embodiment, the vidicon output signals are amplified in amplifier 100 and the voltage for each scan line v(t) is connected to integrator 102, difference amplifier 104 and comparator 106. The integrator 102 computes the mean voltage $\overline{v}$ which is held in sample and hold circuit 108. The sample and hold circuit 108 when triggered applies the mean voltage $\overline{v}$ to difference amplifier 104 and comparator 106. The comparator 106 compares the means voltage $\overline{v}$ with the video voltage v(t) and produces a logic one if the voltage v(t) is less than the mean voltage, and if not, it produces a logic 0. The output of the comparator 106 is applied to integrator 110 which computes a point on the probability distribution curve Pr(V(t)<v). Integrator 110 is connected to sample and hold circuit 112 which holds the probability distribution curve voltage. Integrators 102 and 110 are reset by the TV horizontal blanking pulses which are applied thereto through an inverter 114. The sample and hold circuits 108 and 112 are triggered by monostable multivibrators 116 and 118, also known as one shot multivibrators, connected serially to the TV horizontal blanking pulses. The output of sample and hold circuit 112 which is the probability distribution curve voltage P' = Pr(v(t)<$\overline{v}$) is applied to difference amplifier 120. The difference amplifier 120 is also coupled to a reference voltage equal to the 50 percent point of the probability distribution curve. The output of the difference amplifier 120 is a voltage representation of the difference ($\Delta$P) between point P' and r (FIG. 5). The output of difference amplifier 120 (FIG. 6) is connected to a variable resistor 122 set to the proportionality constant k. Thus, the voltage on the arm of variable resistor 122 is equal to the difference voltage ($\Delta$V) which is the distance m to r between the 50 percent points of the desired distribution curve and the observed distribution curve. The arm of variable resistor k is connected to the difference amplifier 104 and the $\Delta$V voltage, which represents the video correction voltage is applied to the video input signals. Thus, the corrected video output is provided as the output of the difference amplifier 104. Difference amplifier 104 is connected to an amplifier 124 where the corrected video output is amplified for display on the cathode ray tube.

Figure 7B:
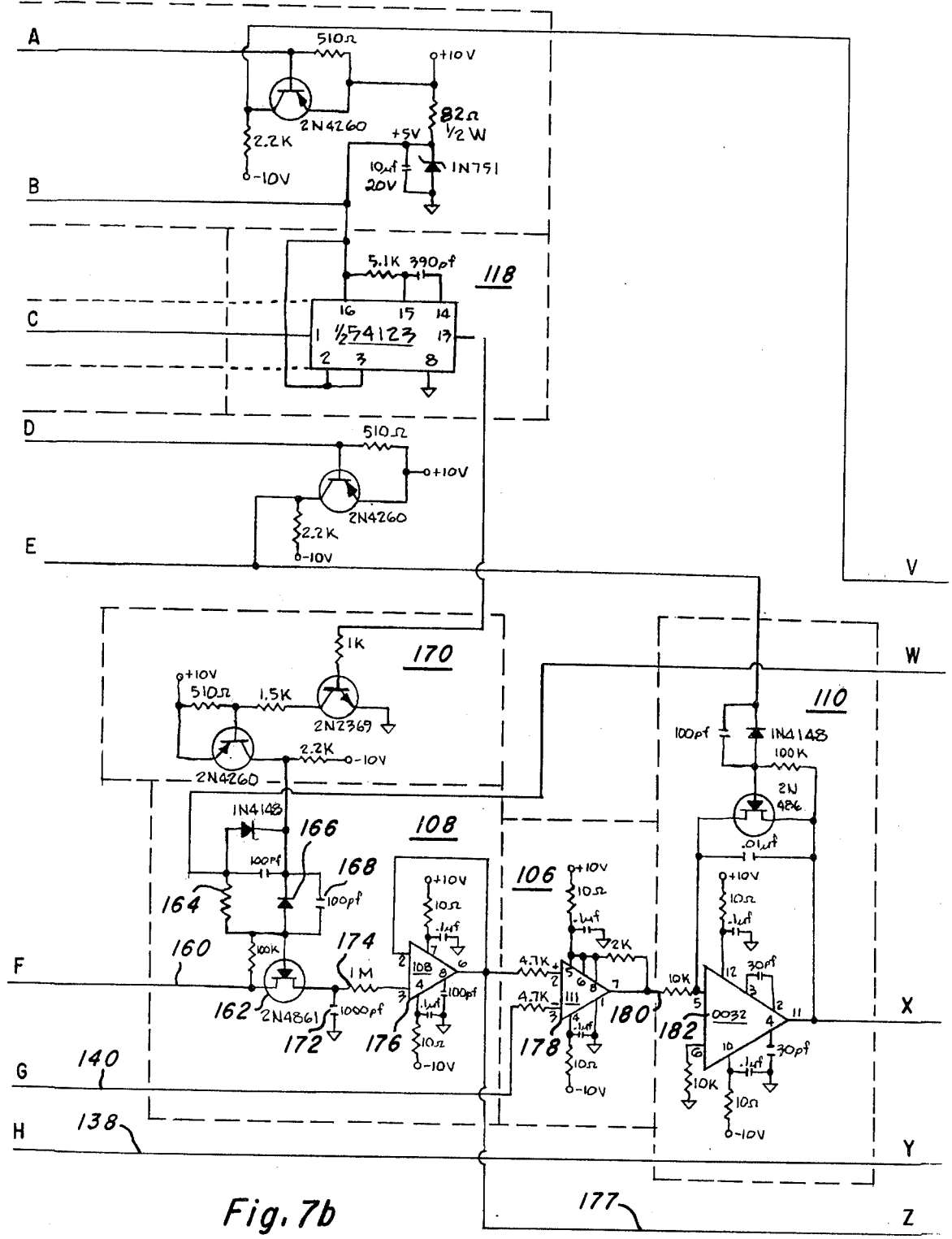
Figure 7C:
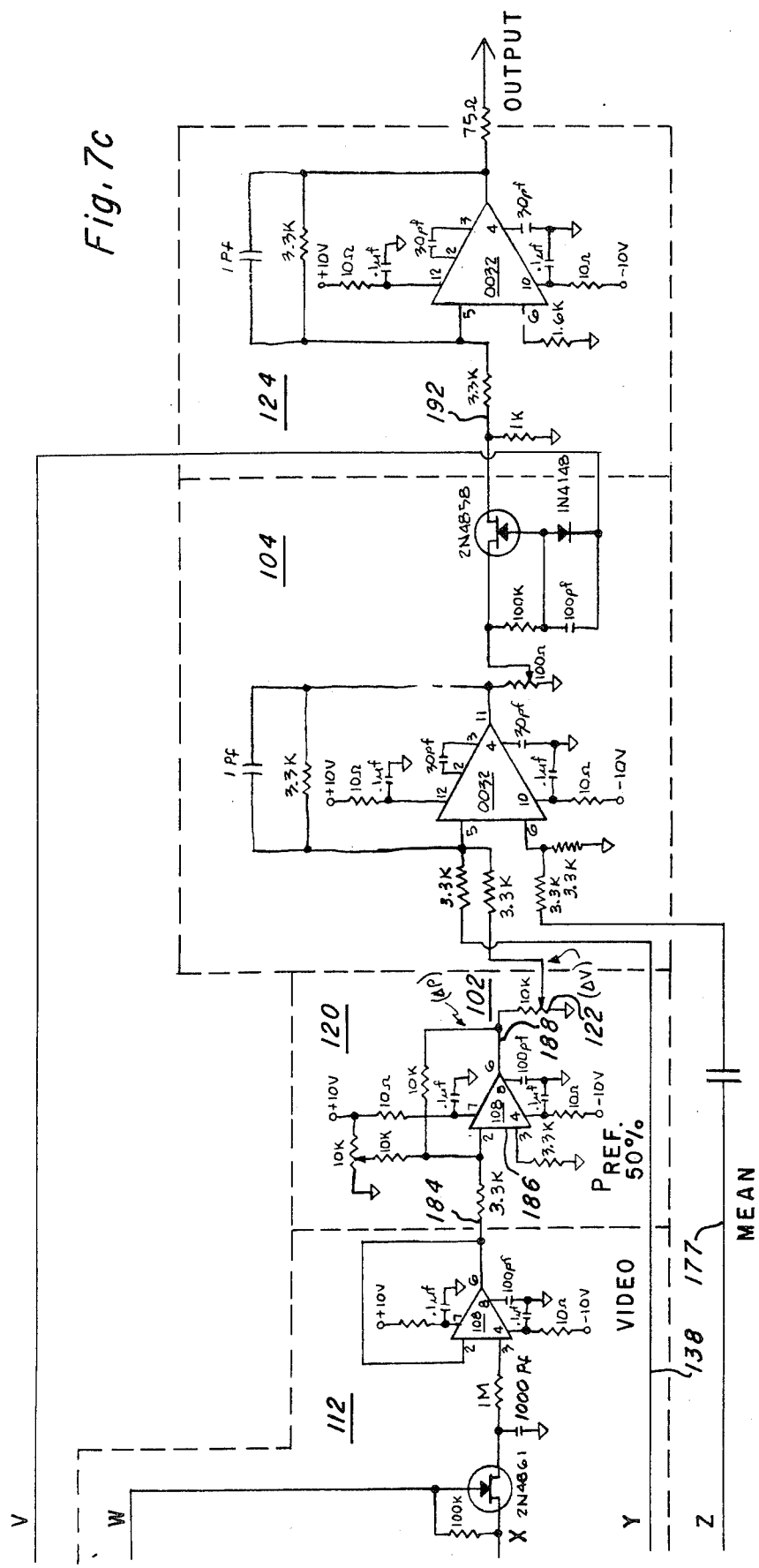

Referring now to FIGS. 7a-c for a description of the circuit diagram for the second embodiment of the streak reduction system. The high and low video frequencies of the vidicon 24 are capacitively coupled by capacitors 126 and 128 (FIG. 7a) and resistors 130 and 132 to terminals of operational amplifier (op amp) 134. Op amp 134 is a standard operational amplifier sold under Part No. LM0032. The output of the operational amplifier 134 is connected through leads 136, 138, and 140 to integrator 102, operational amplifier 104 (FIG. 7c) and comparator 106 (FIG. 7b), respectively. Integrator 102 (FIG. 7a) comprises a variable resistor 142 having one end connected to the output of amplifier 100 through lead 136 and its other end connected to the junction of capacitor 144 and an input terminal of operational amplifier 146. Operational amplifier 146 may be another LM0032 operational amplifier. The variable resistor 142 and capacitor 144 form the time constant for the operational amplifier 146. The integrator, op amp 146, is controlled by a switch which includes the field effect transistor 148, resistor 150, diode 152 and capacitor 154. The switch is controlled by the output of the signal inverter 114 which is applied to the switch through an amplifying circuit 156. The output of operational amplifier 146 is the minus mean voltage of the video signals.

Operational amplifier 158 is connected to the output of op amp 146 to provide a positive mean voltage of the integrator 102. Operational amplifier 158 may be a LH118 operational amplifier. The output of the integrator 102 is applied to sample and hold circuit 108 (FIG. 7b) through lead 160. Lead 160 is connected to a switch for the sample and hold circuit which consists of field effect transistor 162, resistor 164, diode 166 and capacitor 168. The switch is controlled by the output of the monostable multivibrator 118 coupled to amplifying circuit 170. Sampling of the sample and hold circuit is accomplished by connecting the source of field effect transistor 162 to the junction of capacitor 172 and resistor 174. The resistor 174 is coupled to the positive terminal of operational amplifier 176. When triggered by the switch, the mean voltage $\bar{v}$ of the video voltage $v(t)$ is applied to comparator 106 and to operational amplifier 104 (FIG. 7c) through lead 177. The comparator 106 (FIG. 7b) comprises an operational amplifier 178 having its input terminals connected to the mean voltage $v$ of the sample and hold circuit 108 and to the video voltage $\bar{v}(t)$ output of amplifier 100 (FIG. 7a) for providing a logic one voltage if $v(t)$ is less than $v$ and a logic 0 if $\bar{v}$ is greater than $v(t)$. The output of the comparator 106 (FIG. 7b) is connected through lead 180 to the integrator 110. Integrator 110 is identical to integrator 102 and need not be described in further detail. However, the coupling of the comparator 106 to the integrator 110 is such that the output of the integrator operational amplifier 182 is opposite in polarity to that of the operational amplifier 146 of the integrator 102; thus, the inverter amplifier 158 of integrator 102 need not be included in integrator 110 and has been deleted. The time control switch of integrator 110 is also coupled to the inverter 114 through amplifier 156. The output of integrator 110 provides a point on the probability distribution curve for $v(t)$ less than $\bar{v}$ to a sample and hold circuit 112 (FIG. 7c). Sample and hold circuit 112 is identical in construction to sample and hold circuit 108 and is connected to the amplifying circuit 170 (FIG. 7b) of sample and hold circuit 108 which is connected to the output of monostable multivibrator 118. The output of sample and hold circuit 112 (FIG. 7c) is applied to difference amplifier 120 through lead 184. Difference amplifier 120 includes an operation amplifier 186. One input terminal of difference amplifier 186 is connected to the sample and hold circuit 112 through lead 184. The other terminal of difference amplifier 186 is coupled to a reference voltage equal to the 50 percent point position on the probability density curve for the video voltage $v(t)$. The output of difference amplifier 186 is the difference voltage ($\Delta P$) which is applied through lead 188 to variable resistor 122. Variable resistor 122 provides the proportionality constant ($k$) of the triangle for moderate skewness of the observed probability distribution function and the desired probability distribution function. Thus, the output of the variable resistor 122 is the video correction voltage $\Delta V$. The video correction voltage $\Delta V$ of the variable resistor 122 is coupled to the other terminal of operational amplifier 104. Operational amplifier 104 has one terminal connected to the junction of the variable resistor 122 ($\Delta V$) output and the video voltage $V(t)$ of amplifier 100. The other terminal of operational amplifier 104 is coupled to the output of sample and hold circuit 108 (FIG. 7b) and the resulting voltage is the video voltage $V(t)$ corrected to eliminate the streaking voltages included therein. The output of operational amplifier 104 (FIG. 7c) is coupled through lead 192 through a switch to an operational amplifier 124 for amplification. The output of amplifier 104 is connected to CRT 28 for display.

Although several embodiments of the invention have been described herein, it will be apparent to a person skilled in the art that various modifications to the details of construction shown and described may be made without departing from the scope of this invention.

What is claimed is:

1. A forward looking infrared system comprising:
   (a) a detector array having a plurality of detector elements for producing a plurality of electrical scan lines responsive to infrared energy emanating from a scene;
   (b) an a.c. coupling means for each detector element of the array of detectors for coupling the electrical energy for each scan line to an amplifier stage;
   (c) a light emitting array means having a plurality of light emitting elements, each light emitting element connected to a corresponding detector element amplifying stage for producing a visible image of the electrical representations of each detector element line scan for producing a visible display representative of the infrared energy emanating from the scene;
   (d) a scanning means, in the path of said light emitting array, said light emitting array writing its light scan lines on the scanning means for conversion by the scanning means to electrical video signals;
   (e) a streak reduction means connected to the output of said scanning means for producing streak reduction signals from the probability density function of a video scan line and applying the streak reduction signal to the video signal, said streak reduction means including:
      (i) a delay means for delaying one scan line of video signals;
      (ii) means for locating the mean voltage of a succeeding scan line of video signals;
      (iii) means for locating the mode voltage of the probability density function for the succeeding scan line of video signals;
      (iv) comparing means for comparing the mean voltage and the mode voltage for producing a streak correction signal for the video signals;
      (v) means for applying the streak correction signal to the video signals of the display means; and
   (f) a display for displaying the video signal.

2. A forward looking infrared system according to claim 1 wherein the delay means is a CCD delay line.

3. A forward looking infrared system according to claim 1 wherein the means for locating the mean voltage is an integrator.

4. A forward looking infrared system according to claim 1 wherein the means for locating the mode voltage comprises an analog processor for sampling the video signals during one scan period and a locator means for locating the maximum probability density of the analog signals of the analog processor.

5. A forward looking infrared system according to claim 1 wherein the comparing means for comparing the mean video voltage with the mode voltage is an adder.

6. A forward looking infrared system according to claim 1 wherein the means for applying the streak correction signal to the video signal comprises a sample and hold circuit for sampling the comparator means and holding the streak correction signal one scan line period, and an adder for summing the video correction signal to the video signals for streak reduction.

7. A forward looking infrared system according to claim 1 wherein the streak reduction means comprises:
   (a) means for receiving the video signals for one scan line for producing and holding a mean voltage thereof;
   (b) a comparator means for comparing the video mean voltage with the video voltage of a succeeding scan line and providing outputs when the video voltage is less than the mean voltage;
   (c) means for receiving the output of the comparator and producing the median voltage of the cumulative probability distribution signal;
   (d) first difference means for subtracting the median voltage from a selected mean reference voltage for producing a difference voltage;
   (e) voltage adjustment means for producing a video correction voltage from the output of the difference means; and
   (f) an adder for adding the video correction voltage to the video mean voltage and video voltage for producing a substantially streaking free video signal for display.

8. A forward looking infrared system according to claim 7 wherein the means for receiving the video signal for one scan line for producing and holding a mean voltage comprises: a first integrator connected to receive the video signals and produce the mean voltage of the video signals for one scan line, and a sample and hold circuit connected to the first integrator for holding the mean voltage.

9. A forward looking infrared system according to claim 7 wherein the comparator means comprises: an operational amplifier having inputs connected to the means for receiving the video signals for one scan line for producing and holding a mean voltage thereof, and to the video signals for a succeeding scan line for producing an output when the video signals are above the means voltage.

10. A forward looking infrared system according to claim 7 wherein the means for receiving the output of the comparator and producing a median voltage of the cumulative probability distribution signal comprises a second integrator.

11. A forward looking infrared system according to claim 7 wherein the first difference means for subtracting the median voltage from a selected mean reference voltage is a difference amplifier.

12. A forward looking infrared system according to claim 1 wherein the voltage adjustment means for producing a video correction signal comprises a variable resistor.

13. A forward looking infrared system according to claim 1 wherein the adder for summing the video signals, video mean signal and d.c. video correction signals comprises an operational amplifier.

* * * * *